(12) United States Patent
Choudhury et al.

(10) Patent No.: US 8,291,473 B2
(45) Date of Patent: Oct. 16, 2012

(54) METHODS, SYSTEMS, AND COMPUTER PROGRAM PRODUCTS FOR MODELING A SECURE PRODUCTION NETWORK

(75) Inventors: Ziyad A. Choudhury, Hopewell Junction, NY (US); Domenico Fusca, Pleasant Valley, NY (US); Michael O. Mara, Malta, NY (US); Henry Pouget, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 11/621,687

(22) Filed: Jan. 10, 2007

(65) Prior Publication Data

US 2008/0168550 A1    Jul. 10, 2008

(51) Int. Cl.
*G06F 7/04*    (2006.01)
*G06F 11/00*    (2006.01)
(52) U.S. Cl. .................. 726/3; 726/22; 726/26
(58) Field of Classification Search ........ 726/3
See application file for complete search history.

(56) References Cited

U.S. PATENT DOCUMENTS

| | | | |
|---|---|---|---|
| 6,415,321 B1 | 7/2002 | Gleichauf et al. | |
| 6,816,973 B1 | 11/2004 | Gleichauf et al. | |
| 6,920,474 B2 | 7/2005 | Walsh et al. | |
| 6,981,180 B1 * | 12/2005 | Bailey et al. | 714/38 |
| 7,614,083 B2 * | 11/2009 | Khuti et al. | 726/22 |
| 2002/0093917 A1 * | 7/2002 | Knobbe et al. | 370/252 |
| 2004/0225738 A1 * | 11/2004 | Patel | 709/226 |
| 2007/0208551 A1 * | 9/2007 | Herro | 703/13 |
| 2008/0072050 A1 * | 3/2008 | Klonover et al. | 713/176 |

FOREIGN PATENT DOCUMENTS

EP    1480379 A1    11/2004

OTHER PUBLICATIONS

Barry W. Boehm et al., The TRW Software Productivity System, Copyright 1982 IEEE, pp. 148-156.
Usenix Association, Proceedings of FAST '03: 2nd USENIX Conference on File and Storage Technologies, Copyright 2003 by The USENIX Association, 17 pages.
Mounir Benaissa, et al.—"The integration of the supervision in the MES environment within the framework of the Extended Enterprise"—Proceedings 14th European Simulation Symposium, Oct. 26, 2002, XP002483355.
PCT/EP2007/063973—Filed Dec. 14, 2007—PCT ISR/WO.

* cited by examiner

*Primary Examiner* — Taghi Arani
*Assistant Examiner* — Mohammad Rahman
(74) *Attorney, Agent, or Firm* — Cantor Colburn LLP; Wenji Li

(57) ABSTRACT

Methods, systems, and computer program products for modeling a secure production network are provided. A method includes generating a test network for emulating production operations, capturing and analyzing data traffic occurring over the secure production network and a non-secure production network, and determining data flow requirements for isolating the secure production network and the non-secure production network from the test network. The data flow requirements are determined from results of data traffic capture and analysis. The method also includes generating business log from the data flow requirements and applying the business logic to a firewall associated with the test network. The business logic permits transmission of a subset of secure production data to the test network and prevents receipt of incoming transmission at the secure production network.

24 Claims, 2 Drawing Sheets

METHODS, SYSTEMS, AND COMPUTER PROGRAM PRODUCTS FOR MODELING A SECURE PRODUCTION NETWORK

BACKGROUND OF THE INVENTION

The present disclosure relates generally to data handling and analysis and, in particular, to methods, systems, and computer program products for modeling a secure production network.

Computer information management (CIM) systems used in automated IC fabrication facilities (Fabs), such as a facility for processing 300 mm wafers, may include an automated manufacturing execution system (MES), an automated material handling system (AMHS), and an automated real time dispatcher (RTD). In such automated facilities, the basic goals are generally the same: to operate the overall facility with very high degree of efficiency, quality and flexibility, in order to maximize productivity and return-on-investment. Often times, this in turn requires optimizing product mix and output, while minimizing downtime.

Minimizing downtime in an active production system environment can be challenging. Manufacturing equipment requires general maintenance and repairs that consumes valuable production time. In addition, new and updated applications used in facilitating the manufacturing process in a fabrication facility oftentimes interfere with production during installation and testing. For example, MES tools (e.g., IBM's® SiView products) utilize databases to store real time data and communicate information to automated systems in the facility. When updating/testing MES and supporting applications (e.g., Murata's® Automated Material Handling System), access to real time data and supporting applications need to be enabled on a live network. Scripts may be used for testing real time data. However, when these test systems access the MES and interact with production activities, there may be adverse effects on the daily manufacturing quota (e.g., degradation of the availability commitment of the MES).

What is needed, therefore, is a way to access real time production data from a test environment without impacting production systems or environments.

BRIEF SUMMARY OF THE INVENTION

Embodiments of the invention include a method for modeling a secure production network. The method includes generating a test network for emulating production operations, capturing and analyzing data traffic occurring over the secure production network and a non-secure production network, and determining data flow requirements for isolating the secure production network and the non-secure production network from the test network. The data flow requirements are determined from results of data traffic capture and analysis. The method also includes generating business logic from the data flow requirements and applying the business logic to a firewall associated with the test network. The business logic permits transmission of a subset of secure production data to the test network and prevents receipt of incoming transmissions at the secure production network.

Additional embodiments include a system for modeling a secure production network. The system includes a host system. The system also includes a network analyzer and a network isolation application executing on the host system. The network analyzer and network isolation application implement a method. The method includes generating a test network for emulating production operations, capturing and analyzing data traffic occurring over the secure production network and a non-secure production network, and determining data flow requirements for isolating the secure production network and the non-secure production network from the test network. The data flow requirements are determined from results of data traffic capture and analysis. The method also includes generating business logic from the data flow requirements and applying the business logic to a firewall associated with the test network. The business logic permits transmission of a subset of secure production data to the test network and prevents receipt of incoming transmissions at the secure production network.

Further embodiments include a computer program product for modeling a secure production network. The computer program product includes instructions for causing a computer to implement a method. The method includes generating a test network for emulating production operations, capturing and analyzing data traffic occurring over the secure production network and a non-secure production network, and determining data flow requirements for isolating the secure production network and the non-secure production network from the test network. The data flow requirements are determined from results of data traffic capture and analysis. The method also includes generating business logic from the data flow requirements and applying the business logic to a firewall associated with the test network. The business logic permits transmission of a subset of secure production data to the test network and prevents receipt of incoming transmissions at the secure production network.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with exemplary embodiments, systems, methods, and computer program products for secure production network modeling are provided. The secure production network modeling provides a means for securing and isolating production systems and networks in a manufacturing environment such that performance data can be securely extracted for testing and compliance of production system applications and upgrades. Real time production data is accessed from a test environment without impacting production systems or environments.

Figure 1:
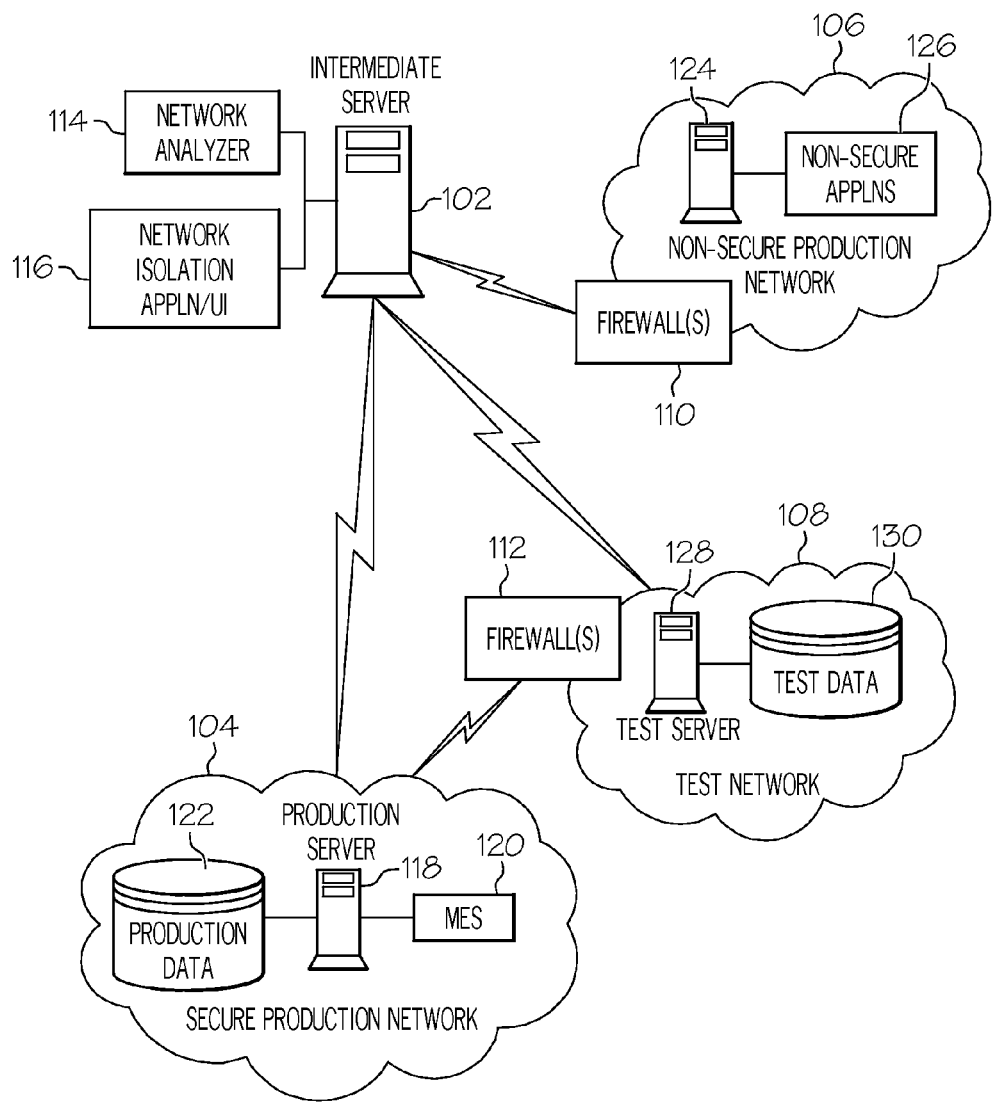
FIG. 1 depicts a portion of a system upon which secure production network modeling may be implemented in accordance with exemplary embodiments.

Turning now to FIG. 1, a portion of an exemplary system upon which the secure production network modeling may be implemented will now be described. The system of FIG. 1 may be a manufacturing facility, e.g., semiconductor manufacturing facility for 300 mm wafers). The system of FIG. 1 includes an intermediate server 102 (also referred to herein as "host system") in communication with a secure production network 104, a non-secure production network 106, and a test network 108. Secure production network 104 is isolated from non-secure production network 106 and test network 108 via the secure production network modeling processes as described further herein.

Secure production network 104, non-secure production network 106, and test network 108, each includes a server 118, 124, and 128, respectively. Each of servers 102, 118, 124, and 128 may be implemented using one or more computer processing devices operating in response to computer programs stored in a storage medium accessible by the servers 102, 118, 124, and 128. One or more of the servers 102, 118, 124, and 128 may operate as network servers (e.g., a web server) to communicate with others of the servers. As indicated above, servers 124 and 128 firewalls 110 and 112, respectively, to prevent unauthorized access to the servers and enforce any limitations on authorized access. Firewalls 110 and 112 may be implemented using conventional hardware and/or software as is known in the art.

One or more of the servers 102, 118, 124, and 128 may also operate as an application server. As indicated above, each of the servers execute one or more computer programs to provide secure production network modeling functions. As previously described, it is understood that separate servers may be utilized to implement the network server functions and the application server functions. Alternatively, the network server, the firewall, and the application server may be implemented by a single server executing computer programs to perform the requisite functions.

In exemplary embodiments, intermediate server 102 performs functions for establishing one or more networks that include specified network devices and isolating one or more networks from other designated networks as described herein. By isolating network devices, the various network devices and processes can be emulated in a test environment that enables access to real production data while maintaining the integrity of this data in the production environment. Intermediate server 102 implements one or more applications for performing these functions. As depicted in the system of FIG. 1, intermediate server 102 implements a network analyzer 114 and network isolation application 116. Network analyzer 114 monitors network communications and captures network traffic from production server 118 and non-secure production server 124 as described herein. Network analyzer 114 may be implemented using a sniffer or similar technique for capturing the network traffic. In exemplary embodiments, network isolation application 116 analyzes the data captured by the network analyzer 114 and identifies data flows required in order to create, isolate, and implement a test network. These features are described further in FIG. 2.

In addition, the network isolation application 116 may include a user interface component for entering information used in identifying and isolating secure production systems and for facilitating secure communications among the networks of FIG. 1.

Production server 118 implements one or more applications used in a manufacturing environment. As shown in the system of FIG. 1, production server 118 executes a manufacturing execution system (MES) application 120 which may be a collective body of various applications as will be appreciated by those skilled in the art. In addition, production server 120 may execute applications, such as automated material handing system (AMHS), material control system (MCS), and other types of manufacturing software.

Production server 118 is in communication with a storage device 122. Storage device 122 may be implemented using a variety of devices for storing electronic information. It is understood that the storage device 108 may be implemented using memory contained in the production server 118 or that it may be a separate physical device. The storage device 122 is logically addressable as a consolidated data source across a distributed environment that includes network 104. Information stored in the storage device 122 may be retrieved and manipulated via the production server 118 and intermediate server 102. The data repository includes one or more databases containing, e.g., production data, among other data. Production data may include manufacturing plans, process routes/steps, process materials, manufacturing schedules, etc.

In exemplary embodiments, server 124 implements applications that are used in support of production operations (e.g., operating systems, utilities, office applications, etc.). These applications are collectively referred to herein as non-secure applications 126. Non-secure production server 124 is isolated from networks 104 and 108 via a firewall thereby restricting access thereto.

In exemplary embodiments, test server 128 performs diagnostics and testing of applications associated with secure production network 104 and non-secure production network 106. Test server 128 may be implemented using various database management products, e.g., Oracle™ or IBM's® DB2. Test server 128 is in communication with a storage device 130. Storage device 130 may be implemented using a variety of devices for storing electronic information. It is understood that the storage device 130 may be implemented using memory contained in the test server 128 or that it may be a separate physical device. The storage device 130 is logically addressable as a consolidated data source across a distributed environment that includes intermediate server 102. Information stored in the storage device 130 may be retrieved and manipulated via the test server 128. The data repository includes one or more databases containing, e.g., test data received from source production network 104. Test data refers to a subset of real production data from secure production network 104 that is fed to the test server 28 and is used for application testing in the test environment of test network 108. The test server 128 may run test scripts or network threads on the test data. The test scripts and network threads are protected from the secure production network 104 as described further herein.

While only three networks 104-108 are shown in the system of FIG. 1, it will be understood that the secure production network modeling processes may provide a multi-tiered network infrastructure consisting of several networks used in implementing the network modeling processes (e.g., engineering test network, vendor tool test network, various application support networks, etc.).

The networks 104, 106, and 108 may be any type of known network including, e.g., a local area network (LAN), a virtual private network (VPN), and an intranet. The networks 104-108 may be implemented using a wireless network or any kind of physical network implementation known in the art.

As indicated above, the secure production network modeling processes enable access of real time production feed data from within a test environment without impacting production systems or environments. The secure production network modeling replicates a portion of the production environment in the test environment. The replication is facilitated via the network analyzer 114 and network isolation application 116 as described in FIG. 2.

Figure 2:
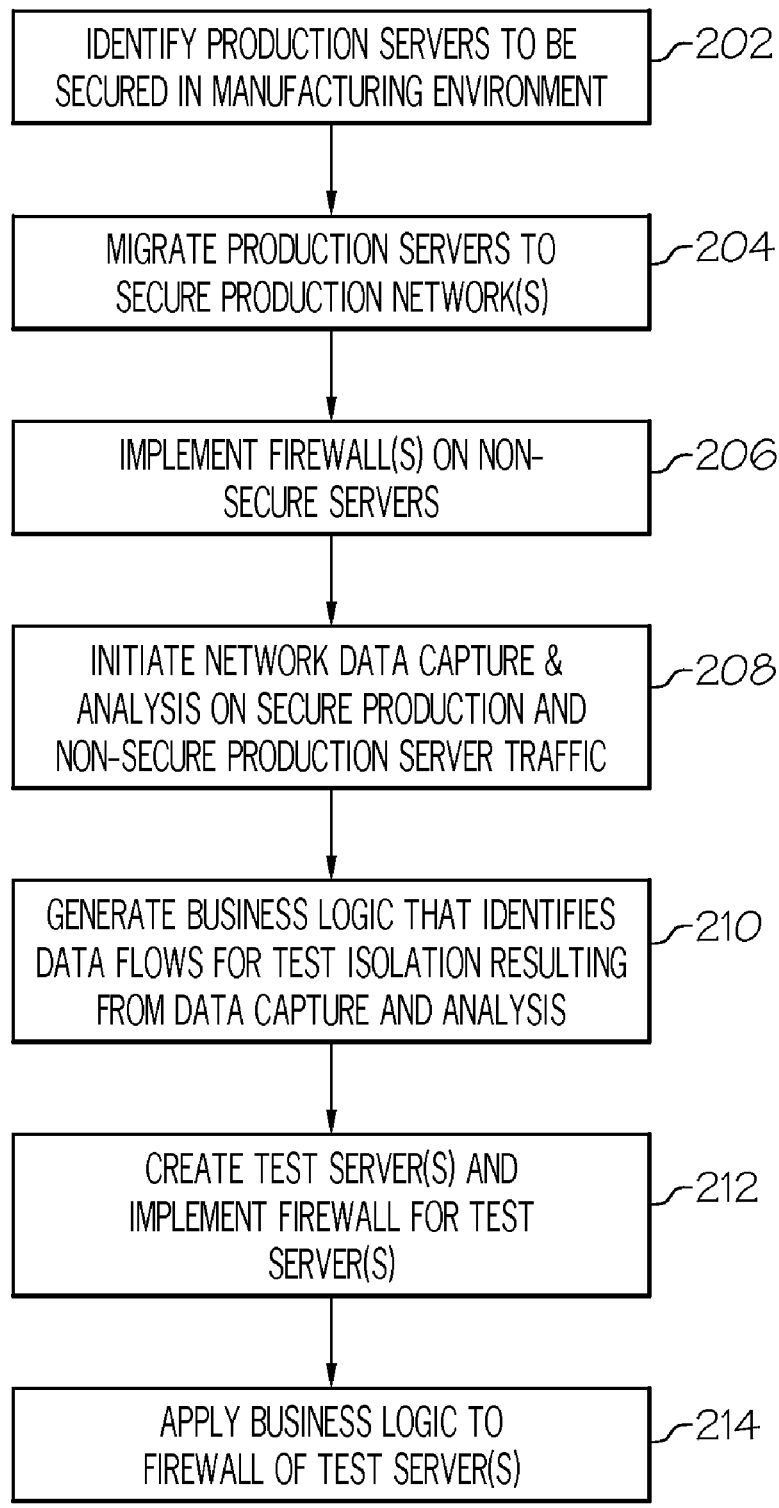
FIG. 2 is a flow diagram describing a process for modeling a secure production network in accordance with exemplary embodiments.

Turning now to FIG. 2, a flow diagram describing a process for modeling a secure production network in accordance with exemplary embodiments will now be described. At step 202, the production servers to be secured in the manufacturing environment are identified. This identification may be implemented by determining which production systems have access to and/or manipulate live production data. At step 204, the production servers identified in step 202 are migrated to a secure production network 104. This migration may be implemented, e.g., using spreadsheet program functions and macros to isolate network subnets and flagging those subnets which are identified in a list of subnets in which network communications should be controlled.

At step 206, firewall 110 is implemented on non-secure production server 124. At step 208, network data capture and analysis is initiated on secure production server traffic in network 104 and also on non-secure production server traffic in non-secure production network 106 via network analyzer 114. For example, a port on the server 118 that is not utilized may be defined for use in transferring a portion or subset of the secure production data in real time to the test network 108. In exemplary embodiments, the traffic that is captured is TCP/IP (Transmission Control Protocol/Internet Protocol) traffic. Large-scale server implementations require support infrastructure services that support, e.g., the design, installation, and operation of a network including network monitoring, security, and access, to name a few. These support services are run from the non-secure production network 106 for supporting the secure production environment (i.e., network 104), the non-secure production environment (i.e., network 106), and also the test network 108. The captured traffic may include all TCP/IP communications from the non-secure production network 106 to the secure production network 104 and the test network 108. The TCP/IP traffic captured contains infrastructure services network connections from the non-secure production environment 106 to the secure production environment 104 and test environment 108, and production database data from the secure production network 104 (e.g., from storage device 122) to the non-secure production network 106, and also contains communication data from the secure production environment 104 to the test environment 108. The captured data contains TCP/IP data that includes connection information relating to testing scripts that are run on the test environment. As described further herein, business logic in, e.g., spreadsheet form, identifies the traffic flows from test to production (e.g., specifically related to the test database communication to the secure production database server). The spreadsheet identifies the infrastructure services communication from the non-secure production environment 106 to the secure production environment 104 and the test environment 108.

At step 210, the network isolation application 116 generates business logic that identifies data flows for test isolation resulting from the data capture and analysis of step 208. In exemplary embodiments, the networks are isolated by running the business logic in the spreadsheet to identify the infrastructure services network communication, the required data path from the intermediate server 102 to the test and non-production environments, 108 and 106, respectively. The logic applied to the spreadsheet may also identify the required infrastructure services communication from the non-secure production environment 106 to the secure production environment 104 and the test environment 108, as well as the return paths. The business logic on the spreadsheet may also identify the communications that are required to be blocked (e.g., the data path from the test data in storage device 130 to production data in storage device 122). The firewalls may be configured with the appropriate rule base to allow the bi-directional communication between non-production environment 106 to the production environment 104 and also to the test environment 108 for allowing these infrastructure services. The isolation logic enables the data transfer of live production data from the intermediate server 102 to the test data storage device 130. In exemplary embodiments, the firewall 112 blocks all communications initiated from the test or non-secure production environments, 108 and 106, respectively, to the secure production environment 104 for directly accessing the secure production data in storage device 122.

At step 212, test server 128 is created and firewall 112 is implemented to restrict access to the server 128. Network address translation (NAT) may be used to implement firewall 112. Firewall 112 is configured to allow the defined port (from step 208) to be passed through the NATTED environment, such that the production data is transferred to the test server 128 during testing.

At step 214, the business logic generated in step 210 is applied to the firewall 112 of the test server 128. The test server 128 is now capable of receiving a production data feed from secure production server 118 and is prevented from initiating the transfer of data to the secure production server 118, thereby preserving the integrity of the production data in storage 122 and prevent interruption or interference with the operation performed by the secure production server 118.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for modeling a secure production network, comprising:
   generating a test network for emulating production operations;
   capturing and analyzing data traffic occurring over the secure production network and a non-secure production network, the secure production network and non-secure production network separated from each other by a first firewall;
   determining data flow requirements for isolating the secure production network and the non-secure production network from the test network, the data flow requirements determined from results of data traffic capture and analysis;
   generating business logic from the data flow requirements and applying the business logic to a second firewall associated with the test network, the business logic identifying traffic that flows between the test network, the secure production network, and the non-secure production network and identifying the data flows requirements from the results of data traffic capture and analysis; and
   forwarding a subset of secure production data received from the secure production network to the test network via the second firewall associated with the test network according to the business logic;
   wherein the business logic permits transmission of the subset of secure production data and a subset of non-secure production data to the test network and prevents receipt of incoming transmissions at the secure production network, in response to the generating of the business logic.

2. The method of claim 1, further comprising:
   migrating a secure production server to the secure production network by identifying a port assigned to the secure production server, the port operable for transmitting the subset of secure production data over the secure production network in real time; and
   migrating a non-secure production server to the non-secure production network;
   wherein the business logic from the data flow requirements includes:
      instructions for directing the secure production server to transmit the subset of secure production data and disregard transmissions received at the port from the second firewall associated with the test network; and
      instructions for receiving data from the non-secure production server.

3. The method of claim 1, wherein the business logic further includes network address translation for the secure production network and the non-secure production network with respect to the test network.

4. The method of claim 1, wherein the non-secure production network provides infrastructure support services to the secure production network, the non-secure production network, and the test network.

5. The method of claim 1, wherein the capturing and analyzing data traffic includes capturing TCP/IP traffic.

6. The method of claim 1, wherein the capturing and analyzing data traffic includes capturing TCP/IP traffic from the non-secure production network to the secure production network and the test network, the TCP/IP traffic including connection information.

7. The method of claim 1, wherein the capturing and analyzing data traffic includes capturing secure production data transmitted from the secure production network to the non-secure production network.

8. The method of claim 1, wherein the capturing and analyzing data traffic includes capturing connection information relating to test scripts executing on the test network.

9. A system for modeling a secure production network, comprising:
   a host system computer; and
   a network analyzer and a network isolation application executing on the host system computer, the network analyzer and the network isolation application collectively perform a method, the method comprising:
      generating a test network for emulating production operations;
      capturing and analyzing data traffic occurring over the secure production network and a non-secure production network, the secure production network and non-secure production network separated from each other by a first firewall;
      determining data flow requirements for isolating the secure production network and the non-secure production network from the test network, the data flow requirements determined from results of data traffic capture and analysis;
      generating business logic from the data flow requirements and applying the business logic to a second firewall associated with the test network, the business logic identifying traffic that flows between the test network, the secure production network, and the non-secure production network and identifying the data flows requirements from the results of data traffic capture and analysis; and
      forwarding the production data received from the secure production network to the test network via the second firewall associated with the test network according to the business logic;
      wherein the business logic permits transmission of a subset of secure production data and a subset of non-secure production data to the test network and prevents receipt of incoming transmissions at the secure production network, in response to the generating of the business logic.

10. The system of claim 9, wherein the network analyzer and the network isolation further perform:
    migrating a secure production server to the secure production network by identifying a port assigned to the secure production server, the port operable for transmitting the subset of secure production data over the secure production network in real time; and
    migrating a non-secure production server to the non-secure production network;
    wherein the business logic from the data flow requirements includes:
       instructions for directing the secure production server to transmit the subset of secure production data and disregard transmissions received at the port from the second firewall associated with the test network; and
       instructions for receiving data from the non-secure production server.

11. The system of claim 9, wherein the business logic further includes network address translation for the secure production network and the non-secure production network with respect to the test network.

12. The system of claim 9, wherein the non-secure production network provides infrastructure support services to the secure production network, the non-secure production network, and the test network.

13. The system of claim 9, wherein the capturing and analyzing data traffic includes capturing TCP/IP traffic.

14. The system of claim 9, wherein the capturing and analyzing data traffic includes capturing TCP/IP traffic from the non-secure production network to the secure production network and the test network, the TCP/IP traffic including connection information.

15. The system of claim 9, wherein the capturing and analyzing data traffic includes capturing secure production data transmitted from the secure production network to the non-secure production network.

16. The system of claim 9, wherein the capturing and analyzing data traffic includes capturing connection information relating to test scripts executing on the test network.

17. A computer program product for modeling a secure production network, the computer program product including instructions embodied on a tangible non-transitory storage medium, the instructions causing a computer to implement a method, comprising:
   generating a test network for emulating production operations;
   capturing and analyzing data traffic occurring over the secure production network and a non-secure production network, the secure production network and non-secure production network separated from each other by a first firewall;
   determining data flow requirements for isolating the secure production network and the non-secure production network from the test network, the data flow requirements determined from results of data traffic capture and analysis;
   generating business logic from the data flow requirements and applying the business logic to a second firewall associated with the test network, the business logic identifying traffic that flows between the test network, the secure production network, and the non-secure production network and identifying the data flows requirements from the results of data traffic capture and analysis; and
   forwarding the production data received from the secure production network to the test network via the second firewall associated with the test network according to the business logic;
   wherein the business logic permits transmission of secure production data and a subset of non-secure production data to the test network and prevents receipt of incoming transmissions at the secure production network, in response to the generating of the business logic.

18. The computer program product of claim 17, further comprising instructions for performing:
   migrating a secure production server to the secure production network by identifying a port assigned to the secure production server, the port operable for transmitting the production data over the secure production network in real time; and
   migrating a non-secure production server to the non-secure production network;
   wherein the business logic from the data flow requirements includes:
      instructions for directing the secure production server to transmit the production data and disregard transmissions received at the port from the second firewall associated with the test network; and
      instructions for receiving data from the non-secure production server.

19. The computer program product of claim 17, wherein the business logic further includes network address translation for the secure production network and the non-secure production network with respect to the test network.

20. The computer program product of claim 17, wherein the non-secure production network provides infrastructure support services to the secure production network, the non-secure production network, and the test network.

21. The computer program product of claim 17, wherein the capturing and analyzing data traffic includes capturing TCP/IP traffic.

22. The computer program product of claim 17, wherein the capturing and analyzing data traffic includes capturing TCP/IP traffic from the non-secure production network to the secure production network and the test network, the TCP/IP traffic including connection information.

23. The computer program product of claim 17, wherein the capturing and analyzing data traffic includes capturing secure production data transmitted from the secure production network to the non-secure production network.

24. The computer program product of claim 17, wherein the capturing and analyzing data traffic includes capturing connection information relating to test scripts executing on the test network.

* * * * *